Sept. 28, 1971  F. C. SCHUTZ  3,608,143
APPARATUS FOR MAKING FORMED PRODUCTS
Original Filed Aug. 14, 1967
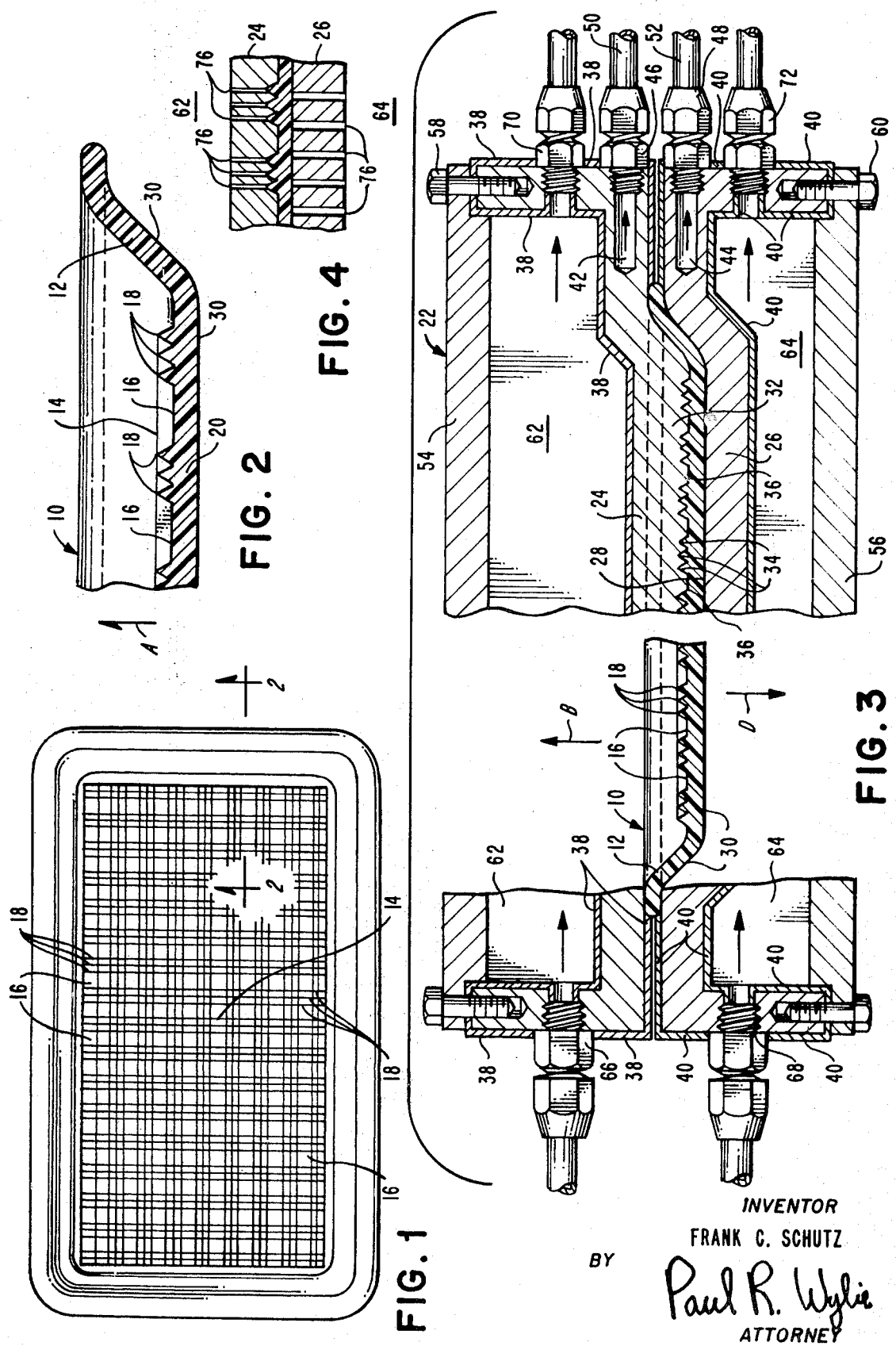
INVENTOR
FRANK C. SCHUTZ
BY
Paul R. Wylie
ATTORNEY

United States Patent Office 3,608,143
Patented Sept. 28, 1971

3,608,143
APPARATUS FOR MAKING FORMED PRODUCTS
Frank C. Schutz, Downey, Calif., assignor to
Dart Industries Inc., Los Angeles, Calif.
Original application Aug. 14, 1967, Ser. No. 660,421.
Divided and this application Apr. 8, 1970, Ser.
No. 31,036
Int. Cl. B29c 17/04
U.S. Cl. 18—19F                                       3 Claims

ABSTRACT OF THE DISCLOSURE

A means and method for making embossed thermo-formed articles particularly adapted for use in forming embossed articles, such as meat trays, and various containers, or packages of material such as foamed styrene plastic or equivalent thermo-plastic material, whereby a vacuum or negative pressure is applied through a perforate mold member at an article forming surface of the mold member so as to vacuum form an embossed surface on the article being manufactured, and particularly during a time when the temperature of the article being formed is sufficient to permit the forming of the material, but insufficient to cause degradation of the cell structure of said material; a die means of the invention, being perforate or made of porous material, permits uniform application of vacuum or negative pressure to an embossed article forming surface of the die means of the invention.

This invention relates to a means and method for making embossed thermo-formed articles, and more particularly, to a means and method for making such articles from foam plastic sheet material, or the like.

This application is a division of Ser. No. 660,421, originally filed Aug. 14, 1967.

BACKGROUND OF THE INVENTION

Various articles have been manufactured from foamed plastic sheet material, such as conventional styrene thermoplastic material, and in some instances, recesses or embossed areas have been formed by a hot stamping process in which one of the die members is provided with protuberances which are sufficiently hot to cause degradation or deformation of the cell structure of the material, and a resultant embossed condition thereof.

This method causes compression or compaction of the material of the article being formed. Further, the conventional hot stamping process requires an additional step in the manufacture of articles such as commercial meat trays, or the like. The hot stamping method actually reduces the depth of the section of the material in the areas in which the material is embossed, thus, reducing the rigidity and ultimate strength of the article, all of which is a particular disadvantage in the manufacture of meat trays, or the like.

SUMMARY OF THE INVENTION

According to the present invention, thermo-plastic foamed material is vacuum formed into various articles, such as meat trays, or the like, by subjecting the foamed material to a negative pressure or vacuum which forces the material into an embossed article forming surface of a mold, such that the depth of section of the embossed area is increased thereby increasing rigidity of a meat tray, or the like. Further, the invention includes a novel method in which the articles of manufacture, such as meat trays, or the like, may be vacuum formed while at a temperature compatible with "post foaming" of the parts immediately after they have been initially molded. Accordingly, a substantial increase in the depth of section of embossed portions of meat trays, or the like, may be attained as a result of the post foaming phenomenon and at a time when the material is at a temperature which permits a negative pressure of partial vacuum to accentuate the post foaming tendency of the material, and to thereby provide for a deep section embossed portion in the bottom of a meat tray, or the like, to support meat or other materials above areas of liquid, and to substantially increase the rigidity of the tray.

Accordingly, it is an object of the present invention to provide a novel means and method for making embossed thermo-formed articles.

Another object of the invention is to provide a novel method for making embossed thermo-formed articles which involves the application of a negative pressure or partial vacuum to one side of the article being formed, while in formable condition, and to thereby accentuate a post foaming tendency of the material to attain a deep embossed section which has substantial rigidity and recess depth.

Another object of the invention is to provide a novel means for making embossed thermo-formed articles which comprises a die member made of porous material having an article forming surface adjacent to which articles may be formed, and whereby a vacuum or negative pressure condition may be imposed through the porous structure of the die to expand a thermal plastic foam article into a deep embossed section.

Another object of the invention is to provide a novel method for producing a die member consisting in machining a die member of porous material to form a molding surface, then leaching the machined molding surface to open the pores thereof, then applying a sealing material on surfaces of the die other than the molding surface, and an evacuation conduit area, such that vacuum may be applied to the porous material of the die member between the sealing material and the article forming surface of the die, whereby vacuum may be applied to the leached article forming machined surface to force formable foamed thermo-plastic material thereagainst.

Further objects and advantages of the invention may be apparent from the following specification, appended claims, and accompanying drawings:

BRIEF DESCRIPTION OF THE DRAWINGS

FIG. 1 is a top or plan view of a conventional meat tray made of foamed thermo-plastic material such as a polystyrene plastic, or equivalent material;

FIG. 2 is an enlarged fragmentary sectional view taken from the line 2—2 of FIG. 1, showing the structure of the tray, including a conventional peripheral inclined rip portion, and a deep post foamed embossed section in the bottom of the tray;

FIG. 3 is a fragmentary sectional view showing a mold means of the invention used in carrying out the method of the invention for the purpose of making embossed thermo-formed articles, such as meat trays, or other articles which may be made of thermo-plastic material; and FIG. 4 is a fragmentary sectional view taken on the same plane as FIG. 3 but showing a modification of the present invention.

DESCRIPTION OF THE PREFERRED EMBODIMENTS

As shown in FIG. 1 of the drawings, a polystyrene foam meat tray structure 10 represents an article manufactured in accordance with the means and method of the invention, and it will be understood that other articles made of similar material may be produced in accordance with the invention.

This tray 10 is provided with upwardly inclined peripheral side portions 12, as shown best in FIG. 2 of the drawings. The tray 10 is provided with an embossed bottom 14, details of which are shown in FIG. 2 of the drawings. This embossed bottom 14 is provided with alternate recesses 16 and intermediate ridges 18. These intermediate ridges 18 are vacuum formed in a direction of an arrow A in FIG. 2 of the drawings, such that the basic depth of the section, of a bottom portion 20 of the tray, is increased by the elevation of the ridges 18 above the recesses 16.

The tops of the ridges 18 extend at right angles to each other, and intersect each other, as shown in FIG. 1 of the drawings, and these ridges 18 support material in the tray, such as meat, chicken or other similar materials, and allow juices or condensates to drain into the recesses 16.

As shown in FIG. 3 of the drawings, a mold means 22 is discclosed, as an example, of die or mold structure which may be used to carry out the method of the invention, and to illustrate at least one embodiment of the means of the invention. It will be understood, however, that the mold structure 22 is illustrated by way of example only, and that a great variety of structural forms and uses thereof may be apparent.

The mold means 22 comprises a pair of mold members 24 and 26 sometimes known as the plug and mold, respectively.

The mold member 26 is provided with a recess cavity portion 28 adapted to mold a bottom surface area 30 of a meat tray, or the like, as shown in FIG. 2 of the drawings. Opposed to the cavity or recess 28 is a corresponding projecting plug portion 32 of the mold member 24. This plug portion 32 is provided with recessed portions 34 adapted to form the ridges 18 of the tray, disclosed in FIG. 2. Intermediate projections 36 of the plug 32 are adapted to form the recesses 16 of the tray, shown in FIG. 2.

The mold members 24 and 26 are preferably made of porous metal, and the features of the cavity 28 of the mold member 26 and the features of the embossing recesses and surfaces 34 and 36 are first machined, this machining causes substantial closure of the porous surface area, whereupon these surfaces are leached by a suitable acid or other material to open the pores after the mold surfaces are machined. Accordingly, the surfaces 28, 34 and 36 of the mold members 24 and 26, respectively, after being machined, are leached by acid or other material, and are restored to their original porous surface condition to form suitable porous negative pressure or vacuum passages to be used, as will be hereinafter described in the forming of an article.

Thee surfaces 28, 34 and 36 thus serve as article forming surfaces adjacent to which articles may be vacuum formed of polystyrene or other suitable thermo-plastic material which as post foaming characteristics, and which may be vacuum formed, when at a temperature compatible with the post foaming characteristics of the material.

The mold members 24 and 26 are provided with respective sealant coatings 38 and 40 which are applied to surfaces of the porous mold members to seal areas other than the article forming mold surfaces, hereinbefore described. These sealant coatings 38 and 40 may be of epoxy resin or any other suitable material, as desired, to provide for efficient creation of a vacuum chamber concentrate negative pressure action through the porous structure of the mold members, and at the article forming surfaces, hereinbefore described.

The mold members 24 and 26 are provided with negative pressure or vacuum passages 42 and 44, respectively, therein. These passages 42 and 44 are drilled in the mold members 24 and 26 and are properly leached to provide for open communication of the pores of the material with the passages 42 and 44. These passages 42 and 44 are coupled by conventional pipe fittings 46 and 48 to respective conduits 50 and 52 adapted to be coupled to a vacuum pump, or the like, for creating a partial vacuum or negative pressure in the porous structure of the mold members 24 and 26 communicating directly with the article forming surfaces 28 and 34 and 36 hereinbefore described.

Coupled with the mold members 24 and 26 are plates 54 and 56, respectively. These plates are secured to the mold members by bolts 58 and 60 to form vacuum chambers 62 and 64 adjacent to the respective mold members 24 and 26. These chambers 62 and 64 are adapted to conduct coolant fluid adjacent to the respective mold members 24 and 26. Coolant fluid is conducted into the coolant chambers 62 and 64 through suitable conduit fittings 66 and 68, and is conducted outwardly from the chambers through suitable conduit fittings 70 and 72, respectively.

The mold members 24 and 26 are relatively movable apart, as indicated by arrows B and D in FIG. 3 of the drawings, and these mold members may be mounted on suitable and conventional mold actuating mechanism, which is no part of the present invention. However, these mold members must be separated in order to remove the articles molded therebetween, as for example, the meat tray 10, as disclosed in FIG. 3 of the drawings.

In accordance with the method of the invention, a polystyrene foamed sheet generally in the form of the tray 10, may be inserted between the mold members 24 and 26, when at a temperature compatible with a post foaming condition of the material, the mold members may be closed against the perimeter of the tray, as shown in FIG. 3 of the drawings, and partial vacuum created within the porous structure of the mold member 24 to cause accentuated post foaming of the material to create the extended ridges 18 around the projections 36 at the article forming surface of the mold member 24. The article forming surface 28 being flat, holds the normally lower side of the tray in contiguous relation therewith, while the opposite side is distended and expanded in an accentuated post foaming function. It will be understood, that tray 10 or other similar articles of manufacture may be first formed and immediately subjected to the operation, hereinbefore mentioned, between the mold members 24 and 26, or the articles such as the tray 10, may be heated to the desired temperature and then placed between the mold members 24 and 26, if desired, whereupon vacuum or negative pressure is applied, as hereinbefore described, which will create a deep section embossed structure, such as shown in FIG. 2 of the drawings, and as hereinbefore described.

In the modification, shown in FIG. 4 of the drawings, the mold members 24 may be provided with a multiplicity of small drilled holes 76 extending therethrough, and communicating with the respective chambers 62 and 64, and vacuum may be applied through the fittings 70 and 72 with the fittings 66 and 68 plugged so as to create a vacuum in the chambers 62 and 64, and to create a vacuum or negative pressure at the article forming surfaces through these small drilled openings 76.

The making of the mold memyers of porous material is the preferred embodiment of the invention inasmuch as the drilling of a large multiplicity of small holes 76 is very tedious, and must be accomplished with great precision, since the holes are small and they must communicate directly with the various recess portions of the article forming surfaces of the mold members 24 and 26.

It will be obvious to those skilled in the art that the invention, including the means and method thereof, may be utilized in the production of a great variety of embossed articles, not only meat trays, but various packages including embossed raised letters, trade names, decorative designs, etc.

It will be appreciated by those skilled in the art that for the sake of definition, the porous material of the mold members 24 and 26 may be considered perforate, which term is also generic to the drilled holes 76, and it is to be considered that the drilled holes and the porous material constitute a perforate mold structure of substantially equivalent function with respect to the operation of the method of the invention. However, it will be appreciated that manufacturing the mold members 24 and 26 of porous material in accordance with the preferred form of the invention, is quite economical, and that any plurality of the passage 42 and 44 in these mold members may be provided for the purpose of distributing the relief areas for creating a partial vacuum or negative pressure with respect to the article forming surfaces of the molds 24 and 26. Additionally, it will be understood that when the chambers 62 and 64 are used as vacuum chambers, in accordance with the disclosure of FIG. 4, that the parts being formed between the mold members may be cooled adiabatically by expansion of the material between the mold members.

It will be understood that cooling of the mold members may be optional depending upon various temperatures of the material, desired rates of cooling, and production, as well as other manufacturing considerations.

It will be obvious to those skilled in the art that various modifications of the present invention may be resorted to in a manner limited only by a just interpretation of the following claims.

I claim:
1. In a means for making embossed thermo-formed plastic articles, the combination of: a mold comprising a pair of mold members; one of said members being of porous material, and having an embossed article molding surface communicating with said porous material of said member, and further having a plurality of holes extending through said porous material; and a negative pressure conduit communicating with said porous material and said plurality of holes for applying a negative pressure internally of said porous material for forcing plastic material of an article being formed against said embossed article molding surface to cause conformance of said plastic material therewith.

2. The invention, as defined in claim 1, wherein: one of said mold members is provided with sealing material sealing external surfaces of said porous material in areas other than said embossed article molding surface, and said conduit.

3. The invention, as defined in claim 2, wherein: coolant fluid chamber means communicates with said mold for cooling said mold members; and means for conducting cooling fluid into and out of said chamber means.

References Cited

UNITED STATES PATENTS

| | | | |
|---|---|---|---|
| 2,190,807 | 2/1940 | Steinberger | 18—35X |
| 2,985,914 | 5/1961 | Miller | 18—35X |
| 3,166,790 | 1/1965 | Keyes | 18—19(F) |
| 3,359,600 | 12/1967 | O'Brien et al. | 18—1(FM) |
| 3,482,281 | 12/1969 | Thiel | 18—35X |
| 3,484,510 | 12/1969 | Corazza | 18—35X |
| 3,353,219 | 11/1967 | Snyder | 18—35 |

ROBERT L. SPICER, Jr., Primary Examiner

U.S. Cl. X.R.

264—90